(12) United States Patent
Merz et al.

(10) Patent No.: US 10,671,818 B2
(45) Date of Patent: *Jun. 2, 2020

(54) SYSTEM AND COMPUTER-IMPLEMENTED METHOD FOR IDENTIFYING DEFECTIVE CHIP CARDS THROUGH SUBSTANDARD TRANSACTION EXPERIENCES

(71) Applicant: Mastercard International Incorporated, Purchase, NY (US)

(72) Inventors: Christopher John Merz, Wildwood, MO (US); Matthew Scott Morice, St. Charles, MO (US); Ravi Santosh Arvapally, St. Louis, MO (US)

(73) Assignee: Mastercard International Incorporated, Purchase, NY (US)

(*) Notice: Subject to any disclaimer, the term of this patent is extended or adjusted under 35 U.S.C. 154(b) by 238 days.

This patent is subject to a terminal disclaimer.

(21) Appl. No.: 15/844,320

(22) Filed: Dec. 15, 2017

(65) Prior Publication Data
US 2019/0188422 A1    Jun. 20, 2019

(51) Int. Cl.
*G06K 7/00*    (2006.01)
*G06K 19/07*    (2006.01)
*G06Q 10/00*    (2012.01)

(52) U.S. Cl.
CPC ....... *G06K 7/0095* (2013.01); *G06K 19/0722* (2013.01); *G06Q 10/00* (2013.01)

(58) Field of Classification Search
CPC ... G06K 19/0722; G06K 7/0095; G06Q 10/00
USPC ............................................. 702/34, 35, 187
See application file for complete search history.

(56) References Cited

U.S. PATENT DOCUMENTS

2019/0188423 A1*   6/2019   Merz .................. G06K 19/0722

\* cited by examiner

*Primary Examiner* — John H Le
(74) *Attorney, Agent, or Firm* — Hovey Williams LLP

(57) ABSTRACT

A system and computer-implemented method for analyzing chip card transactions to identify defective chip cards and/or defective chip readers in need of replacement. Constraints are established to define a subset of card transactions. From a full set of card transactions the subset is identified consisting of each card transaction falling within the constraints and occurring at a merchant having a chip reader. From this subset the unique chip cards are identified, and for each unique chip card a percentage of fallback transactions is calculated. The percentage of fallback transactions is compared to a maximum value, and if the percentage of fallback transactions exceeds the maximum value, the chip card is identified as defective. Each defective chip card is reported to the card issuer, along with at least a recommendation to replace the defective chip card. A similar process may be used to identify defective chip readers of particular merchants.

21 Claims, 4 Drawing Sheets

SYSTEM AND COMPUTER-IMPLEMENTED METHOD FOR IDENTIFYING DEFECTIVE CHIP CARDS THROUGH SUBSTANDARD TRANSACTION EXPERIENCES

FIELD

The present invention relates to systems and methods for analyzing and improving card-based transaction experiences, and more particularly, embodiments provide a system and computer-implemented method for analyzing chip card transactions in order to identify defective chip cards and/or defective chip readers in need of replacement, and thereby improving users' transaction experiences.

BACKGROUND

Card-based transactions may involve several parties, including cardholders, merchants, card issuers, and interchange networks. In some cases, the merchant may deal directly with the card issuer via the interchange network, while in other cases, an acquirer, which may be a bank, credit union, or other financial institution or other business, may act as an intermediary for the merchant. The card issuer may be a financial institution or other business that issues the card to the cardholder. The interchange network may be substantially any network, such as the network provided by Mastercard, Inc., which facilitates the transaction between the merchant/acquirer and the card issuer.

The majority of card issuers have transitioned to Europay, Mastercard, and Visa (EMV)-chip cards, which are more secure than the traditional magnetic strip cards they have largely replaced. However, EMV-chip cards continue to have magnetic strips on them in order to facilitate transactions at merchants whose terminals do not yet have chip readers. Further, EMV-chips may suffer from manufacturing defects, wear, or breakage, such that some percentage of EMV-chip cards do not function as well as desired. As a result, even for merchants who have chip readers, individual EMV-chip cards may not be successfully read, in which case the magnetic strip must be read by a magnetic strip reader (in a so-called "fallback" transaction). Such a substandard experience may not occur every transaction even for the same EMV-chip card, and a card that cannot be read by one chip reader may be read by another. It is unclear why a particular EMV-chip card may intermittently fail to perform, but the occurrence and the effect are undesirable. In particular, using the EMV-chip is more secure and reduces liability over using the magnetic strip, so it is desirable to minimize fallback transactions.

This background discussion is intended to provide information related to the present invention which is not necessarily prior art.

SUMMARY

Embodiments address the above-described and other problems by providing a system and computer-implemented for analyzing and improving card-based transaction experiences by analyzing chip card transactions in order to identify defective chip cards and/or defective chip readers in need of replacement, and thereby improving users' transaction experiences.

In a first embodiment of the present invention, a system is provided for identifying and addressing a transaction problem with a subset of card transactions. The system may broadly comprise electronic communication, memory, and processing elements. The electronic communications element may receive information about a plurality of card transactions via a communications network. The electronic memory element may store the information about the plurality of card transactions as a set of card transactions in a transaction database, and may store one or more constraints which at least partially define the subset of card transactions. The electronic processing element may perform the following actions. The transaction database containing the set of card transactions may be accessed. From the set of card transactions the subset of card transactions may be identified consisting of each card transaction that falls within the one or more constraints and that occurred at a merchant having a chip reader transaction terminal. From the subset of card transactions a plurality of unique cards may be identified. From the plurality of unique cards a plurality of unique chip cards may be identified. For each unique chip card a number of chip transactions and a number of fallback transactions may be identified, wherein the number of chip transactions plus the number of fallback transactions is a total number of attempted chip transactions. For each unique chip card a percentage of fallback transactions may be calculated based on the total number of attempted chip transactions. For each unique chip card the percentage of fallback transactions may be compared to a pre-established maximum card value, and if the percentage of fallback transactions exceeds the pre-established maximum card value, identifying the unique chip card as defective. Each defective unique chip card may be reported to a card issuer of the unique chip card, and it may at least be recommended to the card issuer that each defective unique chip card be replaced.

In a second embodiment of the present invention a computer-implemented method is provided for improving the functioning of a computer for identifying and addressing a transaction problem with a subset of card transactions. The computer-implemented method may broadly comprise the following. One or more constraints may be established to at least partially define the subset of card transactions. A transaction database containing a set of card transactions may be accessed. From the set of card transactions the subset of card transactions may be identified consisting of each card transaction that falls within the one or more constraints and that occurred at a merchant having a chip reader transaction terminal. From the subset of card transactions a plurality of unique cards may be identified. From the plurality of unique cards a plurality of unique chip cards may be identified. For each unique chip card a number of chip transactions and a number of fallback transactions may be identified, wherein the number of chip transactions plus the number of fallback transactions is a total number of attempted chip transactions. For each unique chip card a percentage of fallback transactions may be calculated based on the total number of attempted chip transactions. For each unique chip card the percentage of fallback transactions may be compared to a pre-established maximum card value, and if the percentage of fallback transactions exceeds the pre-established maximum card value, identifying the unique chip card as defective. Each defective unique chip card may be reported to a card issuer of the unique chip card, and it may at least be recommended to the card issuer that each defective unique chip card be replaced.

Various implementations of the foregoing embodiments may include any one or more of the following additional features. The one or more constraints to define the subset of card-based transaction experiences may include at least one of one or more particular card issuers, a particular geographic region, and a particular time period. For each unique chip card a historical percentage of fallback transactions may be determined based on a historical total number of attempted chip transactions over a historical time period that is longer than the particular time period. Identifying the plurality of unique chip cards may include identifying each unique card that was used in a chip card transaction. For each unique chip card a number of different merchants at which the number of fallback transactions occurred may be determined; a week day on which each fallback transaction occurred may be determined; and/or whether a frequency of fallback transactions is changing over time may be determined. The card issuer may be directed to replace the unique chip card identified as defective. The unique chip card identified as defective may be replaced.

For each unique chip card a particular merchant at which each fallback transaction occurred may be determined. For each particular merchant the number of chip transactionsand the number of fallback transactions may be identified. For each particular merchant the percentage of fallback transactions may be calculated based on the total number of attempted chip transactions. For each particular merchant the percentage of fallback transactions may be compared to a pre-established maximum merchant value, and if the percentage of fallback transaction exceeds the pre-established maximum merchant value, the chip reader transaction terminal of the particular merchant may be identified as defective. Each chip reader transaction terminal identified as defective may be reported to the particular merchant, and it may at least be recommended to the particular merchant (or an associated acquirer) that each chip reader transaction terminal identified as defective be replaced. The particular merchant may be directed to replace the chip reader transaction terminal identified as defective, or the chip reader transaction terminal identified as defective may be replaced.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 2D is a diagram showing the relationships between FIGS. 2A, 2B, and 2C.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to processing financial transaction data by a third party in industrial, commercial, and residential applications. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, the present invention relates to systems and methods for analyzing and improving card-based transaction experiences. More particularly, embodiments provide a system and computer-implemented method for analyzing EMV-chip card transactions in order to identify defective EMV-chip cards and/or defective EMV-chip readers in need of replacement, and thereby improving users' transaction experiences.

A particular merchant's EMV-chip reader may process most EMV-chip card transactions without any problems. Occasionally, however, a transaction may not process correctly, and the reason why this occurs may not be known. Embodiments of the present invention may search a database of past transactions for characteristics associated with this type of substandard transaction in order to identify potentially defective EMV-chip cards and/or EMV-chip readers in need of replacement. The decision to recommend, direct, or require replacement of a particular EMV-chip card or a particular EMV-chip reader may be based on it exceeding a maximum number or percentage of substandard transactions.

Figure 1:
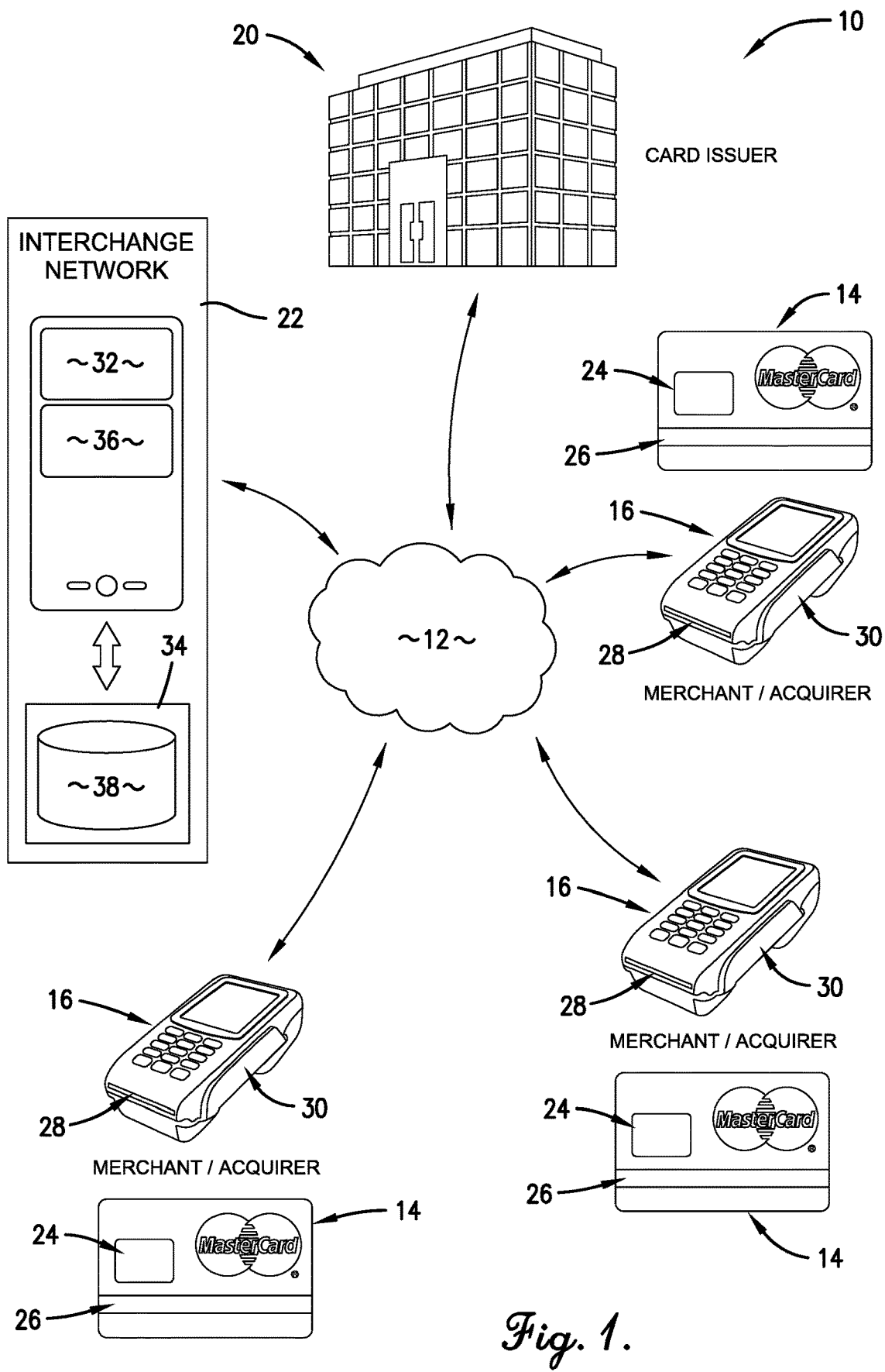
FIG. 1 is a depiction of an embodiment of a system for analyzing and improving card-based transaction experiences.

Referring to FIG. 1, an embodiment of a system 10 and its operating environment is shown for analyzing EMV-chip card transactions in order to identify defective EMV-chip cards and/or defective EMV-chip readers in need of replacement. The system 10 and its operating environment may broadly comprise an electronic communications network 12; a plurality of chip cards 14 used by Cardholders; a plurality of merchant devices 16 operated by Merchants; at least one card issuer system 20 operated by at least one Card Issuer; and an interchange network system 22 operated by an Interchange Network.

The electronic communications network 12 may be substantially any network suitable for communicating signal traffic between the entities involved in the chip card transaction. The chip cards 14 may be substantially any credit, debit, or other payment cards, with each card 14 having an electronic chip 24 using substantially any suitable chip technology, such as an EMV-chip, and a magnetic strip 26. The merchant devices 16 may include chip readers 28 configured to read the chips 24 on the cards 14, and to communicate transaction information, such as information from the chips 24, to the interchange network system 22 via the communications network 12. The devices 16 may further include magnetic strip readers 30 configured to read the magnetic strips 26 on the cards 14, and to communicate transaction information, such as information from the strips 26, to the interchange network system 22 via the communications network 12. The card issuer system 20 may be substantially any suitable processing and communication system for communicating transaction information, such as receiving authentication and authorization requests and transmitting authentication and authorization responses, between the card issuer system 20 and the interchange network system 22 via the communications network 12.

The interchange network system 22 may be substantially any suitable signal processing and communication system configured to facilitate payment transactions between the Cardholders and the Merchants/Acquirers involving the cards 14. The interchange network system 22 may broadly including an electronic communications element 32, an electronic memory element 34, and an electronic processing element 36. The electronic communications element 32 may be configured to facilitate electronic communication via the electronic communications network 12. The electronic memory element 34 may be configured to store electronic data, including data relevant to processing analyzing card transactions, such as a transaction database 38 storing a set of card transactions. The electronic processing element 36 may be configured to execute software to perform various aspects of processing transactions, which may involve accessing data stored on the memory element 34 and/or engaging in communication via the electronic communications element 32 in order to perform aspects or steps of the present invention.

Referring to 2A the system 10 may function substantially as follows. The electronic memory element 34 may store the transaction database 38, and may store one or more analysis constraints which at least partially define the subset of chip card transactions of interest, as shown in 112. The constraints may include one or more particular card issuers, a particular geographic region, and/or a particular time period. The electronic processing element 36 may access the transaction database 38, as shown in 114, and may identify from the set of card transactions a subset of card transactions consisting of each card transaction that falls within the one or more constraints and that occurred at one of the brick-and-mortar Merchants having the merchant devices 16, as shown in 116. The processing element 36 may identify from the subset of card transactions a plurality of unique cards, as shown in 118, and may identify from the plurality of unique cards a plurality of unique chip cards, as shown in 120. Identifying the unique chip cards may be accomplished by identifying from the transaction database 38 each unique card that was used in a chip card transaction.

Figure 2A:
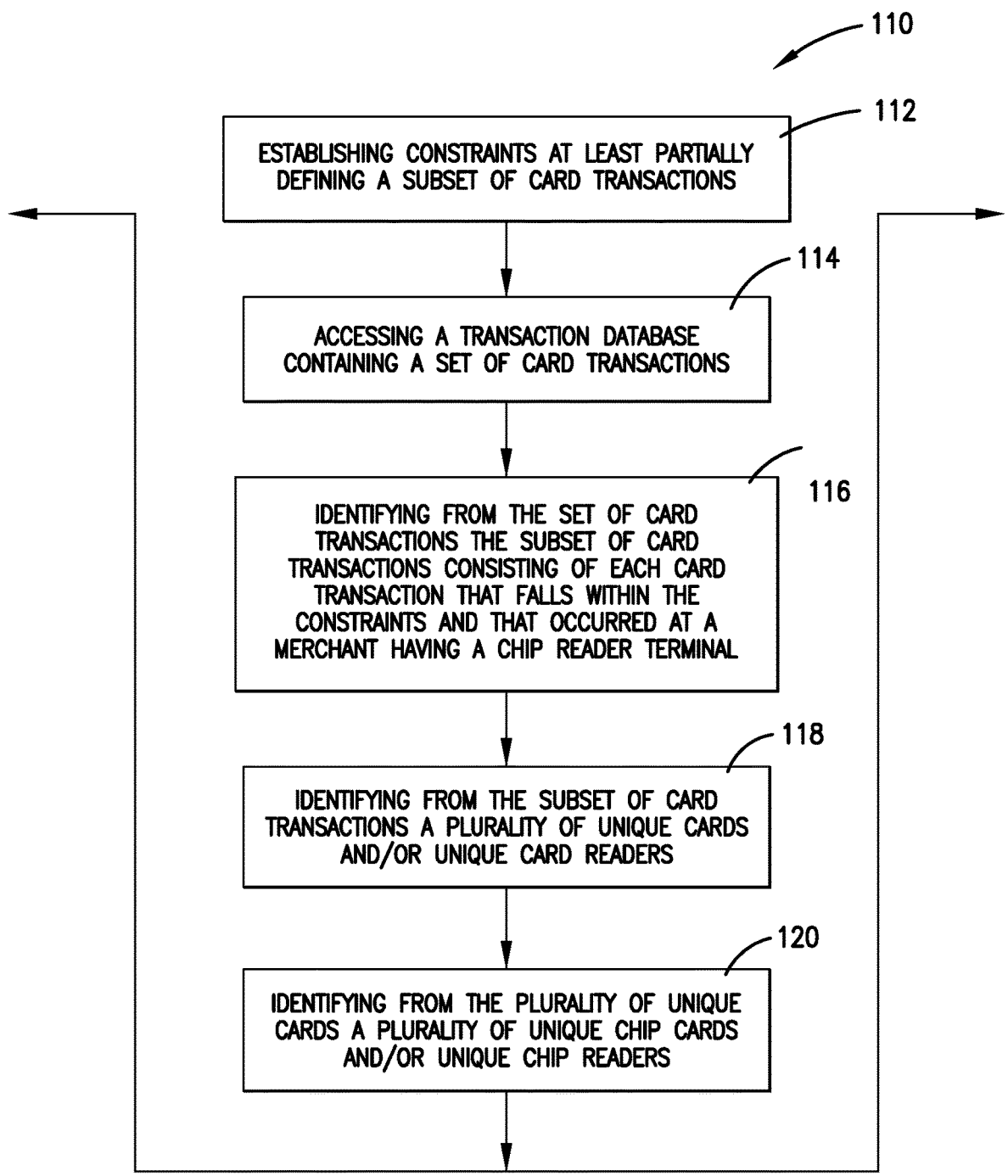
FIG. 2A is a flowchart of steps in a first portion of an embodiment of a computer-implemented method for analyzing and improving card-based transaction experiences.
Figure 2B:
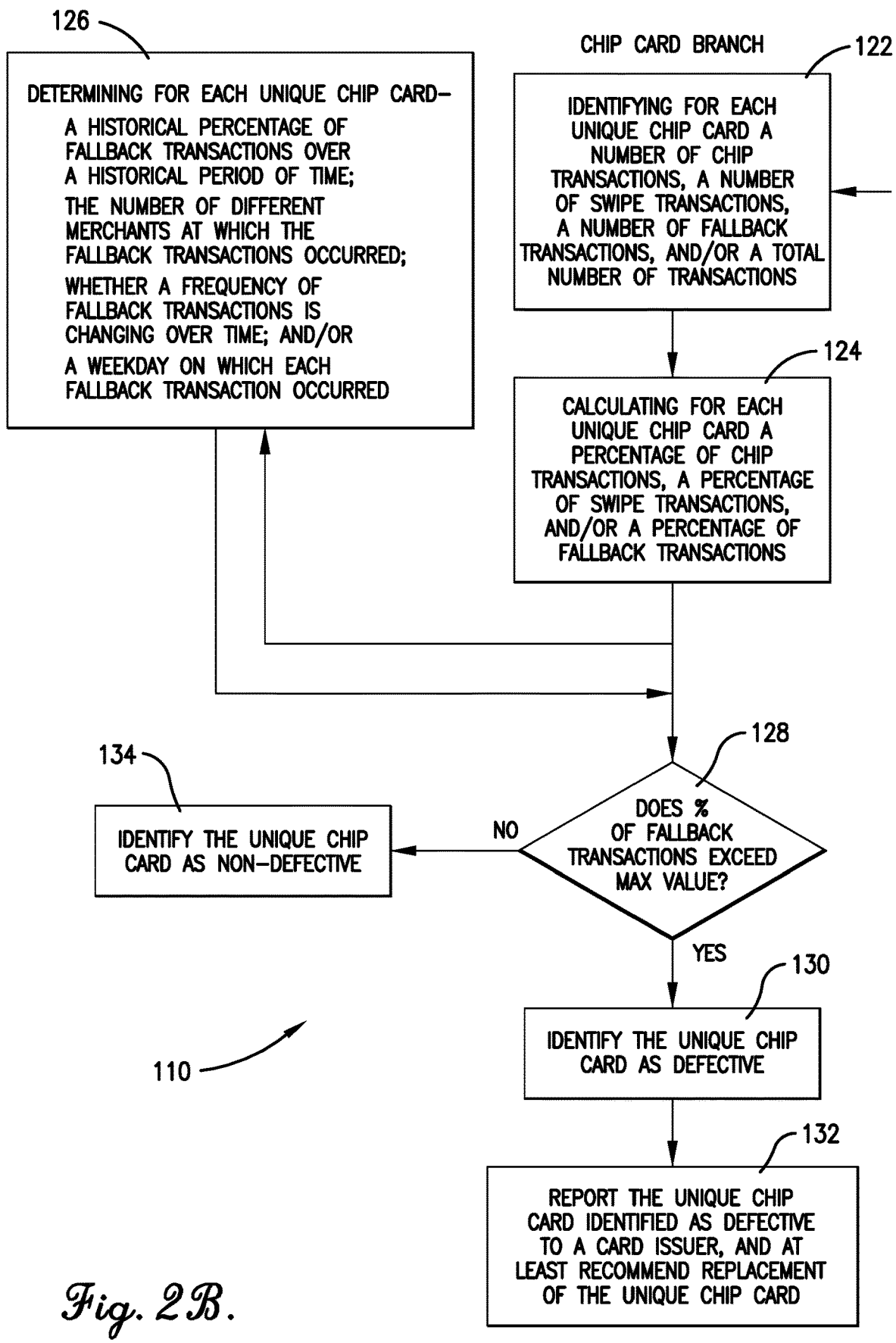
FIG. 2B is a flowchart of steps in a second portion of the computer-implemented method of FIG. 2A.

Referring also to FIG. 2B, the processing element 36 may identify for each unique chip card a number of chip transactions, a number of swipe transactions, a number of fallback transactions, and/or a total number of a certain transaction or combination of certain transactions, as shown in 122, and may calculate for each unique chip card a percentage of chip transactions, a percentage of swipe transactions, and/or a percentage of fallback transactions based on the total number of a certain transaction or combination of certain transactions, as shown in 124. For example, in one implementation, the processing element 36 may identify for each unique chip card a number of chip transactions and a number of fallback transactions, wherein the number of chip transactions plus the number of fallback transactions is a total number of attempted chip transactions, and may calculate for each unique chip card a percentage of fallback transactions based on the total number of attempted chip transactions. For each unique chip card, the processing element 36 may further determine a historical percentage of fallback transactions based on a historical total number of attempted chip transactions over a historical period of time that is longer than the particular period of time; determine the number of different merchants at which the number of fallback transactions occurred; determine a week day on which each fallback transaction occurred; and/or determine whether a frequency of fallback transactions is changing over time, as shown in 126.

The processing element 36 may compare for each unique chip card the percentage of fallback transactions to a pre-established maximum card value (which may be stored in the memory element 34), as shown in 128. If the percentage of fallback transaction exceeds the pre-established maximum card value, the processing element 36 may identify the unique chip card as defective, as shown in 130, and report each unique chip card identified as defective to the card issuer system 20 and at least recommend to the Card Issuer that the defective unique chip card be replaced, as shown in 132. Additionally or alternatively, the processing element 36 may direct the Card Issuer to replace the defective unique chip card, and/or the defective unique chip card may be replaced. If the percentage of fallback transactions does not exceed the pre-established maximum card value, the processing element 36 may identify the unique chip card as non-defective, as shown in 134.

Figure 2C:
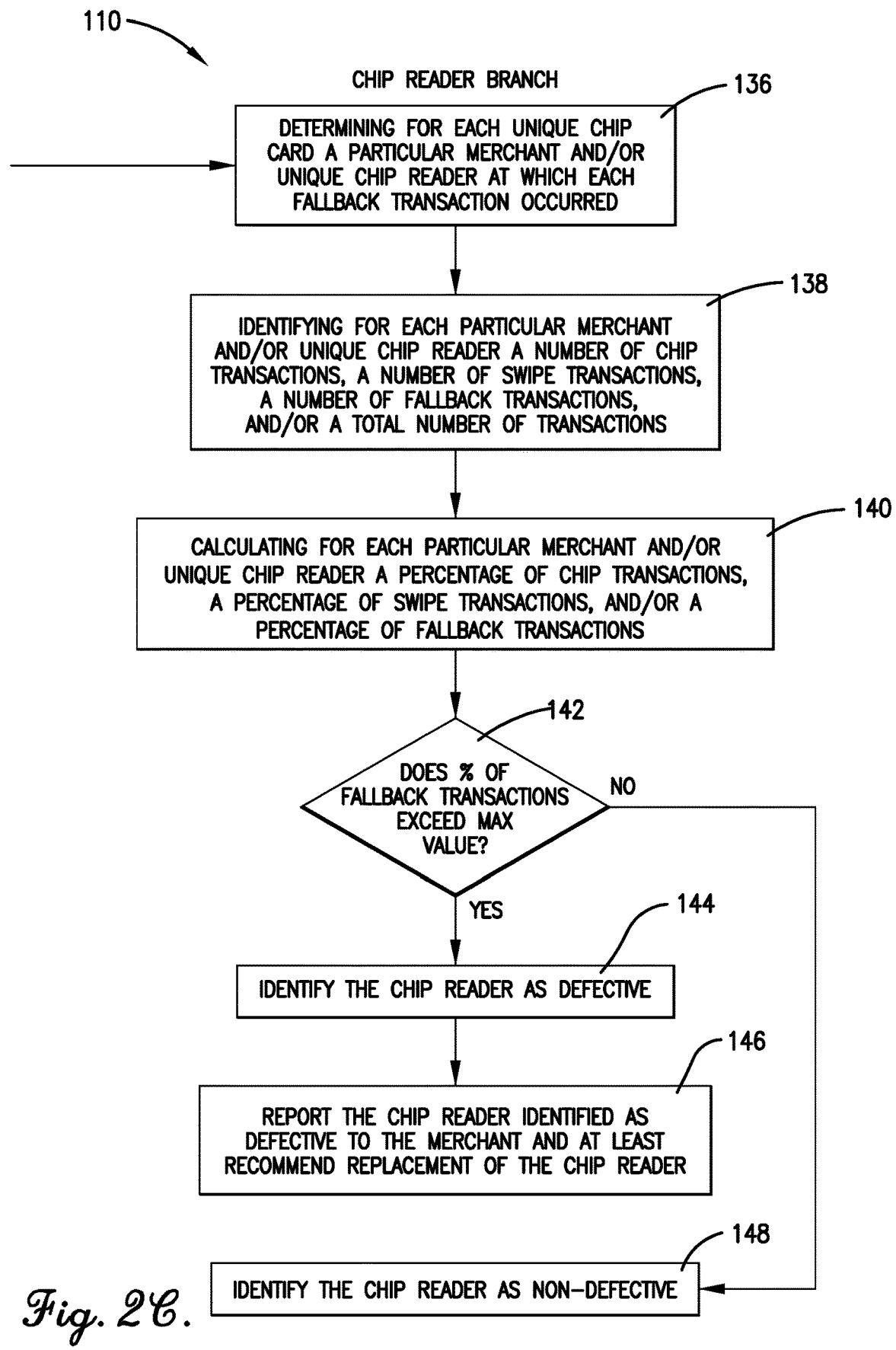
FIG. 2C is a flowchart of steps in a third portion of the computer-implemented of FIG. 2A.

Referring also to FIG. 2C, the processing element 36 may determine for each unique chip card a particular Merchant at which each fallback transaction occurred, as shown in 136. The processing element 36 may identify for each particular Merchant a number of chip transactions, a number of swipe transactions, a number of fallback transactions, and/or a total number of a certain transaction or combination of certain transactions, as shown in 138, and may calculate for each particular Merchant a percentage of chip transactions, a percentage of swipe transactions, and/or a percentage of fallback transactions based on the total number of a certain transaction or combination of certain transactions, as shown in 140. For example, in one implementation, the processing element 36 may identify for each particular Merchant a number of chip transactions and a number of fallback transactions, wherein the number of chip transactions plus the number of fallback transactions is a total number of attempted chip transactions, and may calculate for each unique chip card a percentage of fallback transactions based on the total number of attempted chip transactions.

The processing element 36 may compare for each particular Merchant the percentage of fallback transactions to a pre-established maximum merchant value (which may be stored in the memory element 34), as shown in 142. If the percentage of fallback transaction exceeds the pre-established maximum merchant value, the processing element 36 may identify the chip reader 28 of the particular merchant device 16 as defective, as shown in 144, and may report each chip reader identified as defective to the particular Merchant and at least recommend to the particular Merchant that each defective chip reader be replaced, as shown in 146. Additionally or alternatively, the processing element 36 may direct the particular Merchant to replace the defective chip reader, and/or the defective chip reader may be replaced. Additionally or alternatively, the report, recommendation, or direction may be communicated to an Acquirer associated with the particular Merchant. If the percentage of fallback transaction does not exceed the pre-established maximum merchant value, the processing element 36 may identify the chip reader as non-defective, as shown in 148.

The system 10 may include more, fewer, or alternative components and/or perform more, fewer, or alternative actions, including those discussed elsewhere herein, and particularly those discussed in the following section describing the computer-implemented method.

Referring again to FIGS. 2, 2B, and 2C, an embodiment of a computer-implemented method 110 is shown for analyzing EMV-chip card transactions in order to identify defective EMV-chip cards and/or defective EMV-chip readers in need of replacement. FIGS. 2A, 2B, and 2C show different portions of the method 110, and FIG. 2D shows the relationship between these three figures. The computer-implemented method 110 may be a corollary to the functionality of the system 10 of FIG. 1, and may be similarly implemented using the various components of the system 10 within the above-described exemplary operating environment. Broadly, the method 110 may proceed as follows.

Referring particularly to 2A, one or more constraints on the analysis of the transactions may be established, as shown in 112. The constraints may include a particular card issuer (e.g., a bank), a particular geographic region (e.g., a city or state), and/or a particular time period (e.g., a week or month). For example, the analysis may be limited to transactions involving EMV-chip cards issued by Bank A and used in City B during Time Period C. A transaction database 38 containing a set of all card transaction may be accessed, as shown in 114, and the subset of chip card transactions at brick-and-mortar Merchants having chip readers 28 and falling within the established constraints may be identified from the set of all card transactions, as shown in 116. From the identified subset of chip card transactions, all unique cards may be identified, as shown in 118, and from the identified unique cards, all chip cards may be identified, as shown in 120. Identifying the unique chip cards may be accomplished by identifying from the transaction database 38 each unique card that was used in a chip card transaction.

Referring particularly to FIG. 2B, for each unique chip card a number of chip transactions, a number of swipe transactions, a number of fallback transactions (which ultimately proceed as swipe transactions, but are also identified as fallback transactions), and/or a total number of a certain transaction or a combination of certain transactions may be identified, as shown in 122, and for each unique chip card a percentage of chip transactions, a percentage of swipe transactions, and/or a percentage of fallback transactions may be calculated based on the total number of a certain transaction or a combination of certain transactions, as shown in 124. For example, in one implementation, the processing element 36 may identify for each unique chip card a number of chip transactions and a number of fallback transactions, wherein the number of chip transactions plus the number of fallback transactions is a total number of attempted chip transactions, and may calculate for each unique chip card a percentage of fallback transactions based on the total number of attempted chip transactions. Further, for each unique chip card 14, a historical percentage of fallback transactions based on a historical total number of attempted chip transactions over a historical period of time that is longer than the particular period of time may be determined; the number of different merchants at which the number of fallback transactions occurred may be determined; a week day on which each fallback transaction occurred may be determined; and/or whether a frequency of fallback transactions is changing over time may be determined, as shown in 126. Additional or alternative variables may be created and their values determined. A primary purpose of at least some of these variables is to assist in determining which Cardholders are experiencing an undesirably large number of substandard transactions.

A rule-based card filter may be applied to identify defective cards. In one implementation, for each unique chip card the percentage of fallback transactions may be compared to a pre-established maximum card value, as shown in 128. If the percentage of fallback transaction exceeds the pre-established maximum card value, the unique chip card may be identified as defective, as shown in 130, and each unique chip card identified as defective may be reported to the card issuer system 20 and it may at least be recommended to the Card Issuer that the defective unique chip card be replaced, as shown in 132. Additionally or alternatively, the Card Issuer may be directed to replace the defective unique chip card, and/or the defective unique chip card may be replaced. If the percentage of fallback transaction does not exceed the pre-established maximum card value, the unique chip card may be identified as non-defective, as shown in 134.

Referring also to FIG. 2C, for each unique chip card a particular Merchant at which each fallback transaction occurred maybe determined, as shown in 136. For each particular Merchant a number of chip transactions, a number of swipe transactions, a number of fallback transactions, and/or a total number of a certain transaction or a combination of certain transactions may be determined, as shown in 138, and for each particular Merchant a percentage of chip transactions, a percentage of swipe transactions, and/or a percentage of fallback transactions may be calculated based on the total number of a certain transaction or a combination of certain transactions, as shown in 140. For example, in one implementation, the processing element 36 may identify for each particular Merchant a number of chip transactions and a number of fallback transactions, wherein the number of chip transactions plus the number of fallback transactions is a total number of attempted chip transactions, and may calculate for each unique chip card a percentage of fallback transactions based on the total number of attempted chip transactions.

A rule-based chip reader filter may be applied to identify defective chip readers. In one implementation, for each particular Merchant the percentage of fallback transactions may be compared to a pre-established maximum merchant value, as shown in 142. If the percentage of fallback transaction exceeds the pre-established maximum merchant value, the chip reader 28 of the particular Merchant may be identified as defective, as shown in 144, and each chip reader identified as defective may be reported to the particular Merchant and it may at least be recommended to the particular Merchant that the defective chip reader be replaced, as shown in 146. Additionally or alternatively, the particular Merchant may be directed to replace the defective chip reader, and/or the defective chip reader may be replaced. If the percentage of fallback transactions does not exceed the pre-established maximum merchant value, the chip reader may be identified as non-defective, as shown in 148.

The computer-implemented method 110 may include more, fewer, or alternative actions, including those discussed elsewhere herein.

Any actions, functions, steps, and the like recited herein may be performed in the order shown in the figures and/or described above, or may be performed in a different order. Furthermore, some steps may be performed concurrently as opposed to sequentially. Although the computer-implemented method is described above, for the purpose of illustration, as being executed by an exemplary system and/or exemplary physical elements, it will be understood that the performance of any one or more of such actions may be differently distributed without departing from the spirit of the present invention.

A computer-readable medium comprising a non-transitory medium may include an executable computer program stored thereon and for instructing one or more processing elements to perform some or all of the steps described herein, including some or all of the steps of the computer-implemented method. The computer program stored on the computer-readable medium may instruct the processing element and/or other components of the system to perform additional, fewer, or alternative actions, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processing element," "processor," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processing element." In particular, "a processing element" may include one or more processing elements individually or collectively performing the described functions. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are exemplary only, and are thus not limiting as to the types of memory usable for storage of a computer program.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "communications element" and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for identifying and addressing a transaction problem with a subset of card transactions, the system comprising:

an electronic communications element configured to receive information about a plurality of card transactions via a communications network;

an electronic memory element configured to store the information about the plurality of card transactions as a set of card transactions in a transaction database, and to store one or more constraints which at least partially define the subset of card transactions; and an electronic processing element configured to—
access the transaction database containing the set of card transactions,
identify from the set of card transactions the subset of card transactions consisting of each card transaction that falls within the one or more constraints and that occurred at a merchant having a chip reader transaction terminal,
identify from the subset of card transactions a plurality of unique cards,
identify from the plurality of unique cards a plurality of unique chip cards,
identify for each unique chip card a number of chip transactions and a number of fallback transactions, wherein the number of chip transactions plus the number of fallback transactions is a total number of attempted chip transactions,
calculate for each unique chip card a percentage of fallback transactions based on the total number of attempted chip transactions,
compare for each unique chip card the percentage of fallback transactions to a pre-established maximum card value, and if the percentage of fallback transactions exceeds the pre-established maximum card value, identify the unique chip card as defective, and
report each unique chip card identified as defective to a card issuer of the unique chip card, and at least recommend to the card issuer that each unique chip card identified as defective be replaced.

2. The system of claim 1, wherein the one or more constraints which define the subset of card transactions include at least one of—
one or more particular card issuers,
a particular geographic region, and
a particular time period.

3. The system of claim 2, the electronic processing element being further configured to determine for each unique chip card a historical percentage of fallback transactions based on a historical total number of attempted chip transactions over a historical time period that is longer than the particular time period.

4. The system of claim 1, wherein identifying the plurality of unique chip cards includes identifying each unique card that was used in a chip card transaction.

5. The system of claim 1, the electronic processing element being further configured to determine for each unique chip card a number of different merchants at which the number of fallback transactions occurred.

6. The system of claim 1, the electronic processing element being further configured to determine for each unique chip card a week day on which each fallback transaction occurred.

7. The system of claim 1, the electronic processing element being further configured to determine for each unique chip card whether a frequency of fallback transactions is changing over time.

8. The system of claim 1, the electronic processing element being further configured to direct the card issuer to replace the unique chip card identified as defective.

9. The system of claim 1, further including the card issuer replacing the unique chip card identified as defective.

10. The system of claim 1, the electronic processing element being further configured to determine for each unique chip card a particular merchant at which each fallback transaction occurred.

11. A computer-implemented method for improving the functioning of a computer for identifying and addressing a transaction problem with a subset of card transactions:
establishing one or more constraints to at least partially define the subset of card transactions;
accessing a transaction database containing a set of card transactions;
identifying from the set of card transactions the subset of card transactions consisting of each card transaction that falls within the one or more constraints and that occurred at a merchant having a chip reader transaction terminal;
identifying from the subset of card transactions a plurality of unique cards;
identifying from the plurality of unique cards a plurality of unique chip cards;
identifying for each unique chip card a number of chip transactions and a number of fallback transactions, wherein the number of chip transactions plus the number of fallback transactions is a total number of attempted chip transactions;
calculating for each unique chip card a percentage of fallback transactions based on the total number of attempted chip transactions;
comparing for each unique chip card the percentage of fallback transactions to a pre-established maximum card value, and if the percentage of fallback transactions exceeds the pre-established maximum card value, identifying the unique chip card as defective; and
reporting each unique chip card identified as defective to a card issuer of the unique chip card, and at least recommending to the card issuer that each unique chip card identified as defective be replaced.

12. The computer-implemented method of claim 11, wherein the one or more constraints to define the subset of card-based transaction experiences include at least one of—
one or more particular card issuers,
a particular geographic region, and
a particular time period.

13. The computer-implemented method of claim 12, further including determining for each unique chip card a historical percentage of fallback transactions based on a historical total number of attempted chip transactions over a historical time period that is longer than the particular time period.

14. The computer-implemented method of claim 11, wherein identifying the plurality of unique chip cards includes identifying each unique card that was used in a chip card transaction.

15. The computer-implemented method of claim 11, further including determining for each unique chip card a number of different merchants at which the number of fallback transactions occurred.

16. The computer-implemented method of claim 11, further including determining for each unique chip card a week day on which each fallback transaction occurred.

17. The computer-implemented method of claim 11, further including determining for each unique chip card whether a frequency of fallback transactions is changing over time.

18. The computer-implemented method of claim 11, further including directing the card issuer to replace the unique chip card identified as defective.

19. The computer-implemented method of claim 11, further including replacing the unique chip card identified as defective.

20. The computer-implemented method of claim 11, further including determining for each unique chip card a particular merchant at which each fallback transaction occurred.

21. A computer-implemented method for improving the functioning of a computer for identifying and addressing a transaction problem with a subset of card transactions:
establishing one or more constraints to at least partially define the subset of card transactions, the one or more constraints including a particular time period;
accessing a transaction database containing a set of card transactions;
identifying from the set of card transactions the subset of card transactions consisting of each card transaction that falls within the one or more constraints and that occurred at a merchant having a chip reader transaction terminal;
identifying from the subset of card transactions a plurality of unique cards;
identifying from the plurality of unique cards a plurality of unique chip cards by identifying each unique card that was used in a chip card transaction;
identifying for each unique chip card a number of chip transactions and a number of fallback transactions, wherein the number of chip transactions plus the number of fallback transactions is a total number of attempted chip transactions;
calculating for each unique chip card a percentage of fallback transactions based on the total number of attempted chip transactions;
comparing for each unique chip card the percentage of fallback transactions to a pre-established maximum card value, and if the percentage of fallback transactions exceeds the pre-established maximum card value, identifying the unique chip card as defective; and
reporting each unique chip card identified as defective to a card issuer of the unique chip card, and at least directing the card issuer to replace each unique chip card identified as defective.

\* \* \* \* \*